(12) United States Patent
Palm

(10) Patent No.: US 7,058,123 B2
(45) Date of Patent: Jun. 6, 2006

(54) ACTIVATION OF MULTIPLE XDSL MODEMS WITH HALF DUPLEX AND FULL DUPLEX PROCEDURES

(75) Inventor: Stephen Palm, Tokyo (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 0 days.

(21) Appl. No.: 10/740,767

(22) Filed: Dec. 22, 2003

(65) Prior Publication Data

US 2004/0131111 A1    Jul. 8, 2004

Related U.S. Application Data

(63) Continuation of application No. 09/473,683, filed on Dec. 29, 1999.

(60) Provisional application No. 60/115,294, filed on Jan. 8, 1999.

(51) Int. Cl.
*H04L 5/16* (2006.01)

(52) U.S. Cl. ..................... 375/222

(58) Field of Classification Search ............ 375/219, 375/220, 222, 295, 316, 354, 358, 365; 370/276, 370/241, 250, 298, 299, 277, 278, 282; 379/1.01, 379/9, 15.01, 88.19, 242, 258, 399.01
See application file for complete search history.

(56) References Cited

U.S. PATENT DOCUMENTS

| | | |
|---|---|---|
| 4,679,227 A | 7/1987 | Hughes-Hartogs |
| 4,680,773 A | 7/1987 | Amundson |
| 4,897,831 A | 1/1990 | Negi et al. |
| 4,953,210 A | 8/1990 | McGlynn et al. |
| 5,144,651 A | 9/1992 | Cooper |
| 5,163,131 A | 11/1992 | Row et al. |
| 5,280,586 A | 1/1994 | Kuntz et al. |
| 5,311,578 A | 5/1994 | Bremer et al. |
| 5,321,722 A | 6/1994 | Ogawa |

(Continued)

FOREIGN PATENT DOCUMENTS

CA    2111543    6/1994

(Continued)

OTHER PUBLICATIONS

ITU-T Recommendation V.8 bis ("Procedures for the Identification and Selection of Common Modes of Operation Between Data Circuit-Terminating Equipments (DCEs) and Between Data Terminal Equipments (DTEs) Over the General Switched Telephone Network and On Leased Point-to-Point Telephone-Type Circuits"), published by the International Telecommunication Union in Aug., 1996.

(Continued)

*Primary Examiner*—Pankaj Kumar
(74) *Attorney, Agent, or Firm*—Greenblum & Bernstein, P.L.C.

(57) ABSTRACT

Method for performing a startup session to establish a communication session between a remote communication system and a central communication system. A start-up procedure is initiated by one of the remote communication system and the central communication system. The remote communication system selects one of a full duplex operating mode and a half duplex operating mode in response to a request by the central communication system. The remote communication system and the central communication system then exchange data representing a capability of at least one communication standard that is usable by each communication system to select a mutually compatible communication standard, so that the remote communication system can initiate the communication session using the acknowledged full duplex or half duplex operating mode.

3 Claims, 12 Drawing Sheets

U.S. PATENT DOCUMENTS

| | | | | |
|---|---|---|---|---|
| 5,349,635 A * | 9/1994 | Scott | ................... | 379/93.34 |
| 5,371,534 A | 12/1994 | Dagdeviren et al. | | |
| 5,377,188 A | 12/1994 | Seki | | |
| 5,396,486 A * | 3/1995 | Scott | ................... | 370/296 |
| 5,400,322 A | 3/1995 | Hunt et al. | | |
| 5,410,343 A | 4/1995 | Coddington et al. | | |
| 5,448,566 A | 9/1995 | Richter et al. | | |
| 5,463,382 A | 10/1995 | Nikas et al. | | |
| 5,463,661 A | 10/1995 | Moran, III et al. | | |
| 5,479,447 A | 12/1995 | Chow et al. | | |
| 5,491,720 A | 2/1996 | Davis et al. | | |
| 5,493,609 A | 2/1996 | Davis et al. | | |
| 5,608,764 A | 3/1997 | Sugita et al. | | |
| 5,633,890 A | 5/1997 | Ahmed | | |
| 5,644,573 A | 7/1997 | Bingham et al. | | |
| 5,668,857 A | 9/1997 | McHale | | |
| 5,682,419 A | 10/1997 | Grube et al. | | |
| 5,715,277 A | 2/1998 | Goodson et al. | | |
| 5,751,914 A | 5/1998 | Coley et al. | | |
| 5,757,803 A | 5/1998 | Russell et al. | | |
| 5,781,617 A | 7/1998 | McHale et al. | | |
| 5,796,808 A | 8/1998 | Scott et al. | | |
| 5,805,669 A | 9/1998 | Bingel et al. | | |
| 5,826,198 A | 10/1998 | Bergins et al. | | |
| 5,852,655 A | 12/1998 | McHale et al. | | |
| 5,867,487 A * | 2/1999 | Normand et al. | ................... | 370/296 |
| 5,898,761 A | 4/1999 | McHale et al. | | |
| 5,903,608 A | 5/1999 | Chun | | |
| 5,910,970 A | 6/1999 | Lu | | |
| 5,912,921 A | 6/1999 | Warren et al. | | |
| 5,933,454 A | 8/1999 | Cioffi | | |
| 5,970,088 A | 10/1999 | Chen | | |
| 6,002,722 A | 12/1999 | Wu | | |
| 6,014,431 A | 1/2000 | McHale et al. | | |
| 6,044,107 A * | 3/2000 | Gatherer et al. | ................... | 375/222 |
| 6,055,268 A | 4/2000 | Timm et al. | | |
| 6,064,693 A | 5/2000 | Oliver et al. | | |
| 6,081,517 A | 6/2000 | Liu et al. | | |
| 6,084,599 A * | 7/2000 | Nakatsuka et al. | ................... | 345/501 |
| 6,088,430 A | 7/2000 | McHale | | |
| 6,141,354 A | 10/2000 | Nakatsugawa | | |
| 6,160,843 A | 12/2000 | McHale et al. | | |
| 6,205,208 B1 | 3/2001 | Detlefsen et al. | | |
| 6,226,280 B1 | 5/2001 | Roark et al. | | |
| 6,263,016 B1 | 7/2001 | Bellenger et al. | | |
| 6,298,065 B1 | 10/2001 | Dombkowski et al. | | |
| 6,307,836 B1 | 10/2001 | Jones et al. | | |
| 6,320,867 B1 | 11/2001 | Bellenger et al. | | |
| 6,396,912 B1 * | 5/2002 | Mueller et al. | ................... | 379/93.32 |
| 6,438,226 B1 | 8/2002 | Guenther et al. | | |
| 6,466,586 B1 | 10/2002 | Darveau et al. | | |
| 6,694,470 B1 | 2/2004 | Palm | | |
| 2003/0103559 A1 | 6/2003 | Palm | | |
| 2003/0165188 A1 | 9/2003 | Palm | | |
| 2003/0206580 A1 | 11/2003 | Palm | | |
| 2004/0027998 A1 | 2/2004 | Palm | | |

FOREIGN PATENT DOCUMENTS

| | | |
|---|---|---|
| CA | 2027230 | 4/1995 |
| EP | 0513527 | 11/1992 |
| EP | 0601260 | 12/1992 |
| EP | 0820168 | 1/1998 |
| EP | 0831624 | 3/1998 |
| EP | 0974202 | 1/2000 |
| JP | 6-97980 | 4/1994 |
| JP | 10-75279 | 3/1998 |
| WO | 97/49229 | 12/1997 |
| WO | 98/10545 | 3/1998 |
| WO | 99/35756 | 7/1999 |

OTHER PUBLICATIONS

F. Mescam, entitled "Introduction A La Procedure De Transmission HDLC", published at pp. 69-73 of L 'Onde Electrique, vol. 53, No. 2 (Feb., 1973).

H. Ohba et al., entitled "End-to-End Protocol Based On CCITT X.25 and Its Implementation", published at pp. 281-287 of Evolutions In Computer Communications, Kyoto Sep. 26-29, 1978, International Conference On Computer Communication, Tokyo, Japan, vol. CONF. 4, Sep. 1978.

K. Krechmer at pp. 63, 64 and 66 of Data Communications, McGraw Hill, NY, vol. 23, No. 2 (Jan. 21, 1994), entitled "V.34 Modems: Off to a Fast Start?".

ITU-T recommendation G.994.1 ("Handshake Procedures For Digital Subscriber Line (DSL) Transceivers"), published by the International Telecommunication Union in Feb., 2001.

ITU-T Recommendation V.8 bis ("Procedures for the Identification and Selection of Common Modes of Operation Between Data Circuit-Terminating Equipment (DCEs) and Between Data Terminal Equipments (DTEs) Over the General Switched Telephone Network and On Leased Point-to-Point Telephone-Type Circuits"), which was published by the International Telecommunication Union in Aug., 1996.

An article by K. Krechmer at pp. 63, 64 and 66 of Data Communications, McGraw Hill, NY, vol. 23, No. 2 (Jan. 21, 1994), entitled "V.34 Modems: Off to a Fast Start?."

An article by F. Mescam, entitled "Introduction A La Procedure De Transmission HDLC", published at pp. 69-73 of L 'Onde Electrique, vol. 53, No. 2 (Feb., 1973).

An article by H. Ohba et al., entitled "End-to-End Protocol Based on CCITT X.25 and Its Implementation", published at pp. 281-287 of Evolutions in Computer Communications, Kyoto Sep. 26-29, 1978, International Conference On Computer Communication, Tokyo, Japan, vol. CONF. 4, Sep. 1978.

ITU-T Recommendation V.8 bis ("Procedures for the Identification and Selection of Common Modes of Operation Between Data Circuit-Terminating Equipments (DCEs) and Between Data Terminal Equipments (DTEs) Over the General Switched Telephone Network and on Leased Point-to-Point Telephone-Type Circuits"), published by the International Telecommunication Union in Aug., 1996.

ITU-T Recommendation V.8 bis ("Procedures for the Identification and Selection of Common Modes of Operation Between Data Circuit-Terminating Equipment (DCEs) and Between Data Terminal Equipments (DTEs) Over the General Switched Telephone Network and On Leased Point-to-Point Telephone-Type Circuits"), which was published by the International Telecommunication Union in Aug., 1996.

An article by K. Krechmer at pp. 63, 64 and 66 of Data Communications, McGraw Hill, NY, vol. 23, No. 2 (Jan. 21, 1994), entitled "V.34 Modems: Off to a Fast Start?."

ITU-T Recommendation V.8 bis ("Procedures for the Identification and Selection of Common Modes of Operation Between Data Circuit-Terminating Equipments (DCEs) and Between Data Terminal Equipments (DTEs) Over the General Switched Telephone Network and On Leased Point-to-Point Telephone-Type Circuits"), published by the International Telecommunication Union in Aug., 1996.

K. Krechmer at pp. 63,64 and 66 of Data Communications, McGraw Hill, NY, vol. 23, No. 2 (Jan. 21, 1994).

ITU-T Recommendation V.8 bis ("Porcedures for the Identification and Selection of Common Modes of Operation Between Data Circuit-Terminating Equipment (DCEs) and Between Data Terminal Equipments (DTEs) Over the General Switched Telephone Network and On Leased Point-to-Point Telephone-Type Circuits"), which was published by the International Telecommunication Union in Aug., 1996.

An article by K. Krechmer at pp. 63, 64 and 66 of Data Communications, McGraw Hill, NY, vol. 23, No. 2 (Jan. 21, 1994), entitled "V.34 Modems: Off to a Fast Start?."

In the periodical, "Nikkei Communications", vol. 252, Aug. 18, 1997, pp. 80-89.

ITU-T Recommendation V.8, Sep. 1994, pp. 1-10.

* cited by examiner

ACTIVATION OF MULTIPLE XDSL MODEMS WITH HALF DUPLEX AND FULL DUPLEX PROCEDURES

CROSS-REFERENCE TO RELATED APPLICATIONS

This is a continuation application of U.S. patent application No. 09/473,683, tiled on Dec. 29, 1999, which claims the benefit under 35 U.S.C. § 119 (e) of U.S. provisional No. 60/115,294, filed on Jan. 8, 1999, the disclosures of both being expressly incorporated by reference herein the their entireties.

BACKGROUND OF THE INVENTION

1. Field of the Invention

The present invention is directed to a communications device, such as, for example, a modem and a method for enabling data communication. and in particular, to an apparatus and method that detects various communication configurations and selects an appropriate communication configuration to establish a communication link.

2. Discussion of Background and other Information

Traditionally, data communication devices, such as, for example, modems (both analog and digital), have been employed over public switched telephone networks (PSTN) to transmit data between a first location and a second location. Such modems operate within a conventional voice band (e.g., approximately 0 through 4 kHz bandwidth) of the PSTN. Early modems transmitted data over the PSTN at a speed of approximately 300 bits per second (bps), or less. Over time, and with the increased popularity of the Internet, faster communication schemes (e.g., modems) were demanded and developed. Currently, the analog modem available (referred to as an ITU-T V.34modem, as defined by the International Telecommunication Union (ITU)). transmits data at a rate of approximately 33,600 bps under ideal conditions. These modems continue to exchange data within the approximate 4 kHz bandwidth of the PSTN.

It is not uncommon to transfer data files that are several megabytes (MB) in size. A modem that operates utilizing the V.34 modulation requires a long time to transfer such a file. As a result, a need has developed for even faster modems.

Accordingly, many new communication methods are being proposed and/or developed to transmit data on the local twisted wire pair that uses the spectrum above the traditional 4 kHz band. For example, various "flavors" (variations) of digital subscriber line (DSL) modems have been/are being developed, such as, but not limited to, for example, DSL, ADSL, VDSL, HDSL, SHDSL and SDSL (the collection of which is generally referred to as xDSL). Several of the various xDSL schemes permit simultaneous communication on a single twisted pair in the voice band and the band above the voice band.

Each xDSL variation employs a different communication scheme, resulting in different upstream and/or downstream transfer speeds, and utilize differing frequency bands of the twisted pair communication channel. A wide range of physical and environmental limitations of the various configurations of the twisted pair wires leads to widely varying expectations of a feasible communication capability bandwidth. Depending on, for example, the quality of the twisted wire pair (e.g., CAT3 wire vs. CAT5 wire), a given xDSL scheme may not be able to transmit data at its maximum advertised data transfer rate.

While xDSL technologies exist and offer the promise of solving the high speed data transfer problem, several obstacles exist to the rapid deployment and activation of xDSL equipment.

Many different xDSL and high speed access technologies solutions have been described in public, proprietary, and/or de facto standards. Equipment at each end of a connection may implement one standard (or several standards) that may (or may not) be mutually compatible. In general, startup and initialization methods of the various standards have been heretofore incompatible.

Line environments surrounding the xDSL data communication schemes, such as, for example, their ability to co-exist with a conventional analog modem that communicates within the conventional voice band (e.g., 0–4 kHz bandwidth), differences in central office equipment, the quality of the line, etc., are numerous, differ significantly, and are complicated. Accordingly, it is essential to be able to determine the capabilities of the communication channel, in addition to being able to determine the capabilities of the communication equipment, in order to establish an optimum and non-interfering communication link.

User applications can have a wide range of data bandwidth requirements. Although a user could always use the highest capacity xDSL standard contained in a multiple xDSL box, in general, that will be the most expensive service, since communication costs are generally related to the available bandwidth. When a low bandwidth application is used, the user may desire the ability to indicate a preference for a low bandwidth xDSL (and hence, a less expensive communication service), as opposed to using a high bandwidth xDSL service. As a result, it is desirable to have a system that automatically indicates user service and application requirements to the other end of the link (e.g., central office).

In addition to the physical composition of the communication equipment and communication channel, high speed data access complexity is also influenced by regulatory issues. The result has been that possible configuration combinations at each end of a communication channel have grown exponentially.

The US Telecommunication Act of 1996 has opened the vast infrastructure of metallic twisted wire pairs to both competitive (CLEC) usage, and the incumbent telephone provider (ILEC) that originally installed the wires. Thus, multiple providers may have differing responsibilities and equipment deployed for a single wire pair.

In a given central office termination, a given communication channel (line) may be solely provisioned for voice-band-only, ISDN, or one of the many new xDSL (ADSL, VDSL, HDSL, SHDSL, SDSL, etc.) services. Since the Carterphone court decision, telephone service users (customers) have a wide range of freedom for placing (i.e., installing and utilizing) communication customer premise equipment (e.g., telephones, answering machines, modems, etc.) on voiceband channels. However, customer premise equipment (CPE) associated with leased data circuits has typically been furnished-by the service provider. As the high speed communication market continues to evolve, customers will also expect and demand freedom in selecting and providing their own CPE for high speed circuits using the band above the traditional voice band. This will place increased pressure on the service providers to be prepared for a wide range of equipment to be unexpectedly connected to a given line.

The customer premise wiring condition/configuration inside of the customer premise (e.g. home, office, etc.) and the range of devices already attached to nodes in the wiring are varied and unspecifiable. For a service provider to dispatch a technician and/or craftsman to analyze the premise wiring and/or make an installation represents a large cost. Accordingly, an efficient and inexpensive (i.e., non-human intervention) method is needed to provide for the initialization of circuits in the situation where a plethora of communication methods and configuration methods exist.

Still further, switching equipment may exist between the communication channel termination and the actual communication device. That switching equipment may function to direct a given line to a given type of communication device.

Thus, a high speed data access start-up technique (apparatus and method) that solves the various equipment, communication channel, and regulatory environment problems is urgently needed.

In the past, the ITU-T has published recommended methods for initiating data communication over voice band channels. Specifically, two Recommendations were produced:

1) Recommendation V.8 (September 1994)—"Procedures for Starting Sessions of Data Transmission over the General Switched Telephone Network"; and 2) Recommendation V.8bis (August 1996)—"Procedures for the Identification and Selection of Common Modes of Operation Between Data Circuit-terminating Equipments (DCEs) and Between Data Terminal Equipments (DTEs) over the. General Switched Telephone Network".

Both Recommendations use a sequence of bits transmitted from each modem to identify and negotiate mutually common (shared) operating modes, such as the modulation scheme employed. protocol. etc. However, both startup sequence Recommendations are applicable only to conventional voice band communication methods. These conventional startup sequences are only designed to work if both ends of the communication are full duplex capable (V.8) or half duplex capable (V.8bis). Since xDSL startup mechanisms may be full duplex or half duplex, alternative procedures are needed to initiate the startup mechanism without knowing whether the devices are full duplex or half duplex capable. Further, it is desirable to include a backward compatibility feature to connect with prior art full duplex systems.

Definitions

During the following discussion, the following definitions are employed:

activating station (calling station)—the DTE, DCE and other associated terminal equipment which originates an activation of an xDSL service;

answering station—the DTE, DCE and other associated terminal equipment which answers a call placed on the PSTN (GSTN);

carrier set—a set of one or more frequencies associated with a PSD mask of a particular xDSL Recommendation;

CAT3—cabling and cabling components designed and tested to transmit cleanly to 16 MHZ of communications. Used for voice and data/LAN traffic to 10 megabits per second;

CAT5—cabling and cabling components designed and tested to transmit cleanly to 100 MHZ of communications;

communication method—form of communication sometimes referred to as modems, modulations, line codes, etc.;

downstream—direction of transmission from the xTU-C to the xTU-R;

Galf—an octet having the value $81_{16}$; i.e., the ones complement of an HDLC flag;

initiating signal—signal which initiates a startup procedure;

initiating station—DTE, DCE and other associated terminal equipment which initiates a startup procedure;

invalid frame—frame that has fewer than four octets between flags, excluding transparency octets;

message—framed information conveyed via modulated transmission;

metallic local loop—communication channel 5, the metallic wires that form the local loop to the customer premise;

responding signal—signal sent in response to an initiating signal;

responding station—station that responds to initiation of a communication transaction from the remote station;

session—active communications connection, measured from beginning to end, between computers or applications over a network;

signal—information conveyed via tone based transmission;

signaling family—group of carrier sets which are integral multiples of a given carrier spacing frequency;

slitter—combination of a high pass filter and a low pass filter designed to split a metallic local loop into two bands of operation;

telephony mode—operational mode in which voice or other audio (rather than modulated information-bearing messages) is selected as the method of communication;

transaction—sequence of messages, ending with either a positive acknowledgment [ACT(1)], a negative acknowledgment (NA), or a time-out;

terminal—station; and upstream: The direction of transmission from the xTU-R to the xTU-C.

Abbreviations

The following abbreviations are used throughout the detailed discussion:

ACK—Acknowledge Message;
ADSL—Asymmetric Digital Subscriber Line;
CCITT—International Telegraph and Telephone Consultative Committee;
CDSL—Consumer Digital Subscriber Line;
DSL—Digital Subscriber Line;
FSK—Frequency Shift Keying;
GSTN—General Switched Telephone Network (same as PSTN);
HDSL—High bit rate Digital Subscriber Line;
HSTU-C—handshaking portion of the xDSL central terminal unit (xTU-C);
HSTU-R—handshaking portion of the xDSL remote terminal unit (xTU-R).
ISO—International Organization for Standardization;
ITU-T—International Telecommunication Union—Telecommunication Standardization Sector;
NAK—Negative Acknowledge Message;
NTU—Network Termination Unit (Customer premise end);
POTS—Plain Old Telephone Service
PSD—Power Spectral Density;
PSTN—Public Switched Telephone Network;
RADSL—Rate Adaptive DSL;
VDSL—Very high speed Digital Subscriber Line;
xDSL—any of the various types of Digital Subscriber Lines (DSL);
xTU-C—central terminal unit of an xDSL; and
xTU-R—remote terminal unit of an xDSL.

SUMMARY OF THE INVENTION

Based on the foregoing, the overall purpose of the present invention is to develop a communication method, modem device and a data communication system that detects and notifies the opposite terminal of which type of duplexing (e.g., full duplex or half duplex) is used.

An object of the present invention is to provide a method for performing a startup session to establish a communication session between a first communication system (such as, for example, a central office system) and a second communication system (such as, for example, a remote system). A start-up procedure is initiated by one of the first communication system and the second communication system transmitting a signal from at least one signal family, with the first communication system acknowledging one of a full-duplex operating mode and a half-duplex operating mode in response to a request by the second communication system. The first communication system then establishes one of the full duplex operating mode and the half duplex operating mode for further communication that is compatible with a mode requested by the second communication system.

Further, a phase of the transmitted signal is reversed at predetermined time intervals.

According to a feature of the invention the first communication system and the second communication system each support an xDSL communication session for initiating a high speed xDSL communication session.

According to another feature of the invention, a low-speed (e.g., analog) communication session can be established if a high-speed communication can not be established.

Another object of the instant invention pertains to a method for performing a startup session to establish one of a full duplex communication and a half duplex communication between a first communication system (such as, for example, a central office system) and a second communication system (such as, for example, a remote system). A communication session (such as, for example, an xDSL communication session) is initiated by one of the first communication system and the second communication system in one of a full duplex operating mode and a half duplex operating mode. A request is issued for the communication session to be established in one of the full duplex operating mode and the half duplex operating mode, the request being issued by the second communication system. The initialization of the communication session is then completed by having the first communication system use one of the full duplex operating mode and the half duplex operating mode that complements a mode requested by the second communication system.

An advantage of the instant invention is that a low-speed communication session may be established if a high-speed communication can not be established. The low-speed communication session comprises a communication session occupying an approximate 4 KHz bandwidth.

According to a still further object of the invention, a method is disclosed for performing a startup session to establish a high speed communication session. A first communication (such as, for example, a remote) system transmits a predetermined signal to a second communication (such as, for example, a central office) system, in which the first communication system and the second communication system both support a half duplex operating mode. The predetermined signal is detected at the second communication system, and the second communication system responds by transmitting a selected signal. The transmission of the predetermined signal is halted for a predetermined time period by the first communication system when the selected signal is detected by the first communication system. A second predetermined signal, indicating a half duplex operating mode, is transmitted by the first communication system upon an expiration of the predetermined time period, and the second communication system stops transmitting upon detection of the second predetermined signal. The half-duplex mode is acknowledged by the second communication system by the turning OFF of the selected signal, so that a high speed half-duplex mode communication session is established.

In a feature of this invention, the first communication system and the second communication system each support a high speed xDSL communication session.

Another feature of the invention resides in the first communication system transmitting the predetermined signal from at least one predetermined set of signal families.

According to an advantage of the invention, the first communication system re-transmits the second predetermined signal when the half-duplex mode is not acknowledged by the second communication system, so as to re-try establishing the high-speed half-duplex mode communication session. Further, the first communication system may transmit a third predetermined signal when the half-duplex mode is not acknowledged by the second communication system, so as to try establishing a full-duplex mode communication session.

According to another advantage of the invention, a low-speed communication session is established if a high-speed half-duplex mode communication session can not be established. Such a communication session comprises a communication session occupying an approximate 4 KHz bandwidth.

Another object of the invention pertains to disclosing a method for performing a startup session of a high speed communication session, in which a first communication (such as, for example, a remote) system transmits a predetermined signal to a second communication (such as, for example, a central office) system, with the first communication system supporting only a half duplex operating mode while the second communication system supports only a full duplex operating mode. The predetermined signal is detected at the second communication system, which responds by transmitting a selected signal. The transmission of the predetermined signal is halted for a predetermined time period when the selected signal is detected by the first communication system. A second predetermined signal, indicating a half duplex operating mode, is then transmitted by the first communication system upon an expiration of the predetermined time period. The first communication system detects that the second communication system continues to transmit the selected signal during the time when the second predetermined signal should have been detected, and thus, concludes that a high speed half duplex operating mode can not be established.

The first communication system and the second communication system may each support an xDSL (e.g., high speed xDSL) communication session.

According to an advantage of the invention, a low-speed communication session (occupying an approximate 4 KHz bandwidth) can be established if the high-speed half duplex operating mode can not be established.

A still further advantage of the invention is that a termination signal can be transmitted by the first communication system to terminate the startup session when the high speed half duplex operating mode can not be established.

In another object of the invention, a startup session of a high speed communication is performed by having a first communication system transmit a first predetermined signal to a second communication system, in which the first communication supports only a full duplex operating mode while the second communication system supports only a half duplex operating mode. The predetermined signal is detected at the second communication system, which responds by transmitting a selected signal. When the selected signal is detected by the first communication system the transmission of the predetermined signal is halted for a predetermined time. A second predetermined signal, indicating a full duplex operating mode, is then transmitted by the first communication system upon an expiration of the predetermined time period. If the first communication system determines that the second communication system has stopped transmitting the selected signal after the second predetermined signal is transmitted, the first communication system concludes that a high speed full duplex operating mode can not be established between the first communication system and the second communication system.

According to a feature of this invention, the first communication system and the second communication system may each support an xDSL (e.g., high speed xDSL) communication session.

Another feature of the invention resides in the invention establishing a low-speed (e.g., analog) communication session if the high speed full duplex operating mode can not be established. The low-speed communication session preferably occupies an approximate 4 KHz bandwidth.

A still further feature of the invention is that a termination signal is transmitted (by, for example, the first communication system) to complete the startup session when the high speed full duplex operating mode can not be established.

In another object of the invention, a method is disclosed for performing a startup session of a high speed communication, by having a central system transmit a predetermined signal to a first communication office system, the first communication system and the second communication system both supporting a half duplex operating mode; detecting the predetermined signal at the first communication system, the first communication system responding to the second communication system by transmitting a selected signal, indicating a half duplex mode, to the second communication system; halting, for a predetermined time period, the transmission of the predetermined signal when the selected signal is detected by the second communication system, a second predetermined signal, indicating a half duplex operating mode, being transmitted by the first communication system to the second communication system; and acknowledging the half-duplex mode by the second communication system, so that a high speed half-duplex mode communication session is established.

Another object of the invention pertains to a method for performing a startup session of a high speed communication, by having a central system transmit a predetermined signal to a first communication system, the first communication system supporting only a half duplex operating mode while the second communication system supports only a full duplex operating mode; detecting the predetermined signal at the first communication system, the first communication system responding to the second communication system by transmitting a selected signal indicating a half duplex operating mode; and detecting, by the first communication office system, that the second communication system continues to transmit the predetermined signal after the selected signal is transmitted, the first communication system concluding that a high speed half duplex operating mode can not be established between the first communication system and the second communication system.

According to a feature of the invention, the first communication system and the second communication system each support a high speed xDSL communication session. Furthermore, a low-speed communication session may be established if the high speed half duplex operating mode can not be established.

A still further feature of the invention is that the first communication system transmits a termination signal to complete the startup session when the high speed half duplex operating mode can not be established.

In another object of the invention, a startup session of a high speed communication is performed by having a central system transmit a predetermined signal to a first communication system, the first communication system supporting only a full duplex operating mode while the second communication system supports only a half duplex operating mode; detecting the predetermined signal at the first communication system, the first communication system responding to the second communication system by transmitting a selected signal, indicating a full duplex mode, to the second communication system; halting the transmission of the predetermined signal when the second communication system detects the selected signal transmitted by the first communication system; and determining, by the first communication system, that the second communication system stopped transmitting the predetermined signal after the selected predetermined signal was transmitted, the first communication system concluding that a high speed full duplex operating mode can not be established between the first communication system and the second communication system.

It is noted that the first communication system and the second communication system may each support a high speed (e.g., xDSL) communication session. Additionally, a low-speed communication session may be established if the high speed full duplex operating mode can not be established. Before establishing the low-speed communication session, the first communication system transmits a termination signal to complete the startup session.

The present disclosure refers to the following documents, the subject matter of which is expressly incorporated herein by reference in their entireties:

Recommendation V.8 (September 1994), entitled "Procedures For Starting Sessions Of Data Transmission Over The General Switched Telephone Network", published by Telecommunication Standardization Sector of the ITU;

Recommendation V.8 bis (August 1996), entitled "Procedures For The Identification And Selection Of Common Modes Of Operation Between Data Circuit-Terminating Equipments (DCEs) and Between Data Terminal Equipments (DTEs) Over The General Switched Telephone Network", published by Telecommunication Standardization Sector of the ITU;

Recommendation T.35, entitled "Procedure For The Allocation Of CCITT Defined Codes For Non-standard Facilities", published by Telecommunication Standardization Sector of the ITU; and Recommendation V.34 (October 1996), entitled "A Modem Operating At Data Signaling Rates Of Up To 33,600 bit/s For Use On The General Switched Telephone Network And On Leased Point-To-Point 2-Wire Telephone-Type Circuits", published by Telecommunication Standardization Sector of the ITU.

The present disclosure relates to subject matter contained in U.S. Provisional Application No. 60/115,294, filed on Jan. 8, 1999, the subject matter of which is expressly incorporated herein by reference in its entirety.

BRIEF DESCRIPTION OF THE DRAWINGS

The foregoing and other objects, features and advantages of the invention will be apparent from the following more particular description of preferred embodiments, as illustrated in the accompanying drawings which are presented as a non-limiting example, in which reference characters refer to the same parts throughout the various views, and wherein.

DETAILED DESCRIPTION OF PREFERRED EMBODIMENTS

The particulars shown herein are by way of example and for purposes of illustrative discussion of embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the present invention may be embodied in practice.

Figure 1:
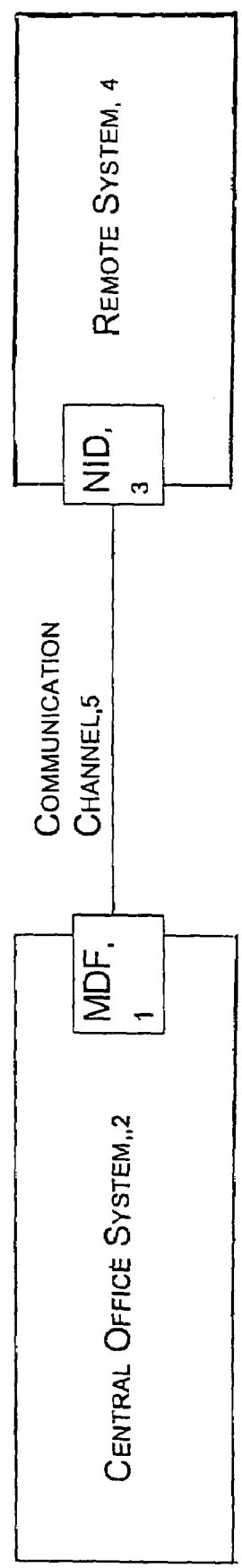
FIG. 1 illustrates a block diagram of a data communication system using a modem device according to a first embodiment of the present invention.

According to a first embodiment of the present invention, a data communication system comprises a central office system 2 and a remote system 4, which are interfaced together via a communication channel 5, as shown in FIG. 1.

The central office system 2 includes a main distribution frame (MDF) 1 that functions to interface the central office system 2 to the communication channel 5. The main distribution frame (MDF) 1 operates to connect, for example, telephone lines (e.g., communication channel 5) coming from the outside, on one side, and internal lines (e.g., internal central office lines) on the other side.

The remote system 4 includes a network interface device (NID) 3 that functions to interface the remote system 4 to the communication channel 5. The network interface device (NID) 3 interfaces the customer's equipment to the communications network (e.g., communication channel 5).

It is understood that the present invention may be applied to other communications devices without departing from the spirit and/or scope of the invention. Further, while the present invention is described with reference to a telephone communication system employing twisted pair wires, it is understood that the invention is applicable to other transmission environments, such as, but not limited to, cable communication systems (e.g., cable modems), optical communication systems, wireless systems, infrared communication systems, etc., without departing from the spirit and/or scope of the invention.

Basic Hardware Description

Figure 2:
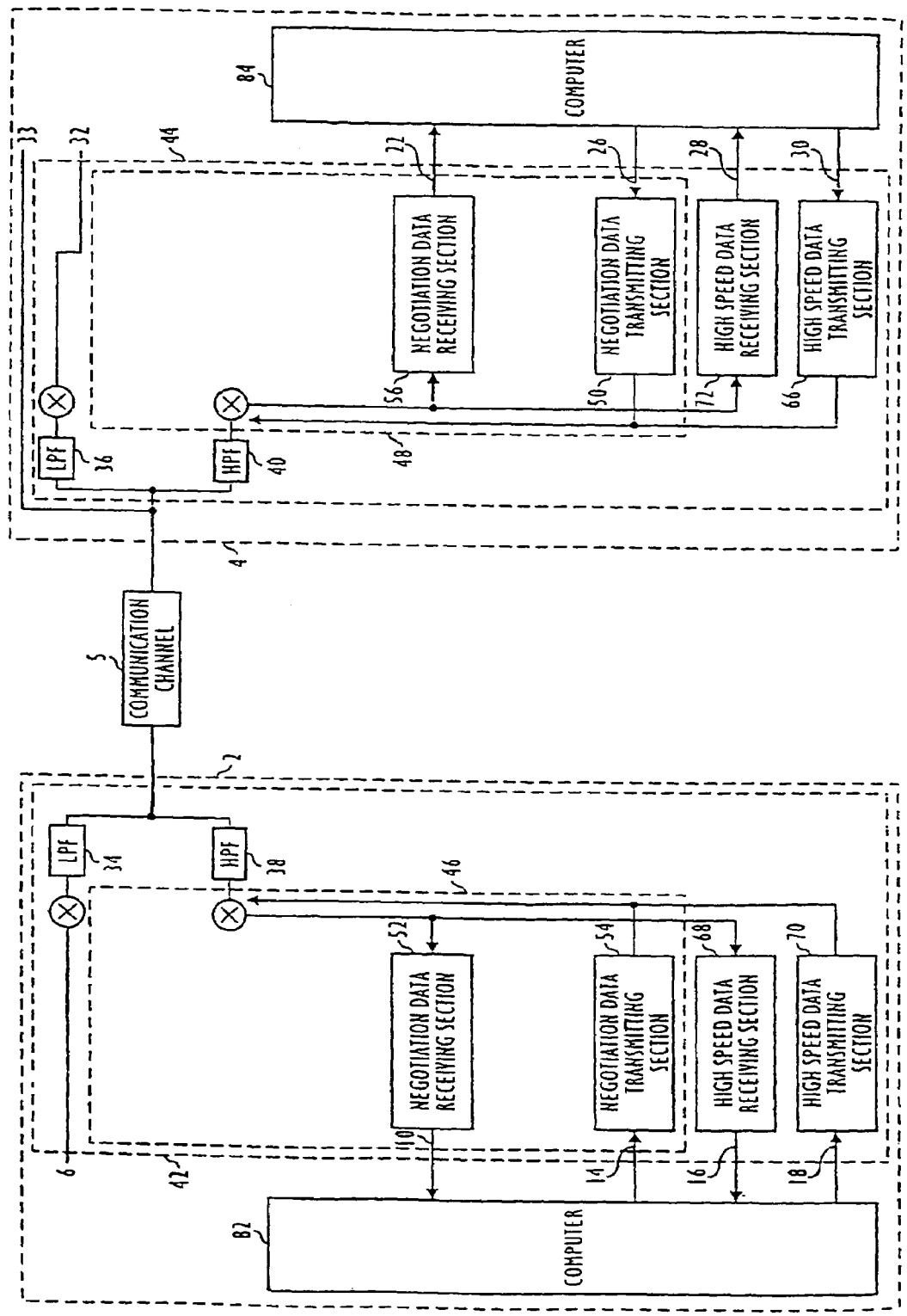
FIG. 2 illustrates a detailed block diagram of a data communication system of FIG. 1.

FIG. 2 illustrates a detailed block diagram of the first embodiment of the data communication system of FIG. 1. This embodiment represents a typical installation, in which both the central office system 2 and the remote system 4 implement the instant invention.

As shown in FIG. 2, the central office system 2 comprises a low pass filter 34 and a high pass filter 38, a test negotiation block 46, a high speed data receiving section 68, a high speed data transmitting section 70, and a computer 82. Computer 82 is understood to be a generic interface to network equipment located at the central office. Test negotiation block 46 performs all of the negotiation and examination procedures which takes place prior to the initiation of an actual high speed data communication.

The low pass filter 34 and high pass filter 38 function to filter communication signals transferred over the communication channel 5. The test negotiation block 46 tests and negotiates conditions, capacities, etc. of the central office system 2, the remote system 4, and the communication channel 5. The procedures of the test negotiation block 46 are completed prior to, and initiate the selection of the high speed modem receiving and transmitting sections (e.g., modems) 68 and 70. The high speed receiving section 68 functions to receive high speed data transmitted from the remote system 4, while the high speed data transmitting section 70 transmits high speed data to the remote system 4. The high speed sections 68 and 70 may comprise, but not be limited to, for example, ADSL, HDSL, SHDSL, VDSL, CDSL modems. High speed sections 68 and 70 can be a plurality of high speed transmission devices which "share" the common block 46 during the initial negotiation procedure. The negotiation data receiving section 52 and the high speed data receiving section 68 transmit signals to computer 82. The negotiation data transmitting section 54 and the high speed data transmitting section 70 receive signals issued from the computer 82.

In the disclosed embodiment, test negotiation block 46 comprises a negotiation data receiving section 52 and a negotiation data transmitting section 54. The negotiation data receiving section 52 receives negotiation data, while the negotiation data transmitting section 54 transmits negotiation data. The operation of the various sections of the central office system 2 will be described, in detail, below.

Remote system 4 comprises a low pass filter 36, a high pass filter 40, a test negotiation block 48, a high speed data receiving section 72, a high speed data transmitting section 66, and a computer 84. Computer 84 is understood to be a generic interface to network equipment located at the remote system. Test negotiation block 48 performs all of the negotiation and examination procedures that take place prior to the actual high speed data communication.

The low pass filter 36 and high pass filter 40 operate to filter communication signals transferred over the communication channel 5. The test negotiation block 48 tests and negotiates conditions, capacities, etc. of the central office system 2, the remote system 4, and the communication channel 5. The high speed receiving section 72 functions to receive high speed data transmitted from the central office system 2, while the high speed data transmitting section 66 transmits high speed data to the central office system 2. The negotiation data receiving section 56 and the high speed data receiving section 72 transmit signals to the computer 84. The negotiation data transmitting section 50 and the high speed data transmitting section 66 receive signals issued from the computer 84.

In the disclosed embodiment, the test negotiation block 48 comprises a negotiation data receiving section 56 and a negotiation data transmitting section 50. The negotiation data receiving section 56 receives negotiation data, while the negotiation data transmitting section 50 transmits negotiation data. The operation of the various sections of the remote system 4 will be described, in detail, below.

The negotiation data transmitting section 50 of the remote system 4 transmits the upstream negotiation data to the negotiation data receiving section 52 of the central system 2. The negotiating data transmitting section 54 of the central system 2 transmits the downstream negotiating data to the negotiation data receiving section 56 of the remote system 4.

The central office system 2 includes a plurality of channels 6, 10, 14, 16 and 18 that are used to communicate with a plurality of channels 22, 26, 28, 30 and 32 of the remote system 4. In this regard, it is noted that in the disclosed embodiment, channel 6 comprises a central voice channel that is used to directly communicate with a corresponding remote voice channel 32 in a conventional voice band (e.g., 0 Hz to approximately 4 kHz), which has been filtered by low pass filters 34 and 36. Further, a remote voice channel 33 is provided in the remote system 4 that is not under the control of the central office system 2. Remote voice channel 33 is connected in parallel with the communication channel 5 (but prior to the low pass filter 36), and thus, provides the same service as the remote voice channel 32. However, since this channel is connected prior to the low pass filter 36, the remote voice channel 33 contains both the high speed data signal and a voice signal.

It is noted that the filters may be arranged to have different frequency characteristics, so that a communication may take place using other, low band communication methods, such as, for example, ISDN, between voice channels 6 and 32. The high pass filters 38 and 40 are selected to ensure a frequency spectrum above 4 kHz. It is noted that some systems do not require, nor implement, some (or all) of the filters 34, 36, 38, and 40.

Bit streams 10, 14, 16 and 18 (in the central office system 2) and bit streams 22, 26, 28 and 30 (in the remote system 4) comprise digital bit streams that are used to communicate between the central computer 82 and the remote computer 84, respectively. It is understood that it is within the scope of the present invention that bit streams 10, 14, 16, and 18 could be implemented as discrete signals (as shown), or bundled into an interface, or cable, or multiplexed into a single stream, without changing the scope and/or function of the instant invention. For example, bit streams 10, 14, 16 and 18 may be configured as (but are not limited to) an interface conforming to a RS-232, parallel, FireWire (IEEE-1394), Universal Serial Bus (USB), wireless, or infrared (IrDA) standard. Likewise, it is understood that bit streams 22, 26, 28 and 30 can be implemented as discrete signals (as shown in the drawings), or bundled into an interface, or cable, or multiplexed into a single stream, as described above.

Negotiation data (e.g., control information) corresponding to the condition of the communication line (e.g., frequency characteristics, noise characteristics, presence or absence of a splitter, etc.), capabilities of the equipment, and user and application service requirements is exchanged between the negotiation data receiving section 52 and negotiation data transmitting section 54 of the central office system 2, and the negotiation data receiving section 56 and negotiation data transmitting section 50 of the remote system 4.

The essential features of the hardware portion of the invention is the functionality contained in the test negotiation blocks 46 and 48, which test and negotiate the conditions, capabilities, etc. of the central office system 2, the remote system 4, and the communication channel 5. In practice, the configuration of the central office system 2 and the remote system 4 is subject to wide variations. For example, the configuration of the external voice channel 33 is not under the control of the same entities that control the central office system 2. Likewise, the capabilities and configuration of the communication channel 5 are also subject to wide variation. In the disclosed embodiment, test negotiation blocks 46 and 48 are embedded within modems 42 and 44. However, the functionality of test negotiation blocks 46 and 48 may, alternatively, be implemented separate and distinct from the modems 42 and 44. Signals transmitted and received between the test negotiation blocks 46 and 48 are used for testing the environment itself as well as communicating the results of the tests between the central office system 2 and the remote system 4.

The purpose of each signal path in FIG. 2 will be explained followed by an explanation of the devices used to create the signals. Examples of specific values for the various frequencies will be discussed in detail, below.

In the disclosed embodiment, frequency division multiplexing (FDM) is utilized for various communication paths to exchange information between the central office system 2 and the remote system 4. However, it is understood that other techniques (such as, but not limited to, for example, CDMA, TDMA, spread spectrum, etc.) may be used without departing from the spirit and/or scope of the present invention.

The range from frequency 0 Hz until frequency 4 kHz is typically referred to as the PSTN voice band. Some of the newer communication methods typically attempt to use the frequency spectrum above 4 kHz for data communication. Typically, the first frequency where transmission power is allowed occurs at approximately 25 kHz. However, any frequency may be used. In this regard, it is noted that tone bursts at a frequency of 34.5 kHz are used to initiate T1E1 T1.413 ADSL modems. As a result, if possible, that frequency should be avoided in the spectrum used by precursor negotiation methods.

The communication paths are defined in pairs, one path for an upstream communication from the remote system 4 to the central office system 2, and another path for a downstream communication from the central office system 2 to the remote system 4. The negotiation upstream bits are transmitted by the negotiation data transmitting section 50 of the remote system 4, and received by the negotiation data receiving section 52 of the central office system 2. The negotiation downstream bits are transmitted by the negotiation data transmitting section 54 of the central office system 2, and received by the negotiation data receiving section 56 of the remote system 4. Once the negotiation and high speed training has been completed, the central office system 2 and the remote system 4 use high speed data transmitting sections 66 and 70, and high speed data receiving sections 72 and 68 to perform a duplex communication.

All messages in the present invention are sent with one or more carriers using, for example, a Differential (Binary) Phase Shift Keying (DPSK) modulation. The transmit point is rotated 180 degrees from the previous point if the transmit bit is a 1, and the transmit point is rotated 0 degrees from the previous point if the transmit bit is a 0. Each message is preceded by a point at an arbitrary carrier phase. The frequencies of the carriers, and the procedures for starting the modulation of carriers and messages, will be described below.

The present invention goes to great lengths, both before the handshake procedure is performed and during, the handshake procedure, to be spectrally polite or as non-obtrusive as possible. Carriers are typically selected so as to be different for the upstream and downstream paths, avoid existing system activation tones, be reasonably robust against inter-modulation products, have sufficient spacing, etc. Some suitable sets of carrier tones using 4.3125 kHz and 4.0 kHz base frequencies, are shown below:

| Signal Designation | Upstream Frequency Indices (N) | | | Downstream Frequency Indices (N) | | |
|---|---|---|---|---|---|---|
| A43 | 9 | 17 | 25 | 40 | 56 | 64 |
| B43 | 37 | 45 | 53 | 72 | 88 | 96 |
| C43 | 7 | 9 | | 12 | 14 | 64 |
| A4 | 3 | | | 5 | | |
| B4 | 4 | 28 | 34 | 66 | 67 | 76 |

After the remote system 4 analyzes the equipment capabilities, the application desires, and the channel limitations, it makes a final decision on the communication method to use.

After the central office system 2 has received the final decision, the transmission of the negotiation downstream data is stopped. When the remote system 4 detects the loss of energy (carrier) from the central office system 2, the remote system 4 stops transmitting the negotiation upstream data. After a short delay, the negotiated communication method begins it's initialization procedures.

Startup Protocol

Either the central office (xTU-C) system 2 or the remote (xTU-R) system 4 may initiate modulation channels. Once the negotiation modulation channels have been established, the remote station is always considered the initiating modem (in terms of the transaction messages), and the central office terminal is considered the responding station.

In the following description, characteristics of the transmitted signals are distinguished and identified by the way the signals are named. Various prefixes and suffixes are added to distinguish between a location on a time sequence and which unit is sending the signal.

TONE (singular)—unmodulated carriers from one carrier family.
TONES (plural)—unmodulated carriers from one or more carrier families.
TONES-REQ (plural)—unmodulated carriers with periodic phase reversals from one or more carrier families.
FLAGS—hex character "7E" sent with modulated carriers
GALF—hex character "81" sent with modulated carriers. (inverse of "7E").

Further, FIGS. 3–12 show two time periods; $\tau_1$ and $\tau_2$. In the disclosed invention, $\tau_1$ is less than approximately 500 ms, and may be, for example, approximately 100 ms. Similarly, in the disclosed invention, $\tau_2$ is greater than approximately 50 ms but less than approximately 500 ms. However, it is understood that different time periods can be employed for $\tau_1$ and $\tau_2$ without departing from the spirit and/or scope of the invention.

xTU-R Initiates Startup—xTU-R And xTU-C Both Support Full Duplex Mode

Figure 3:
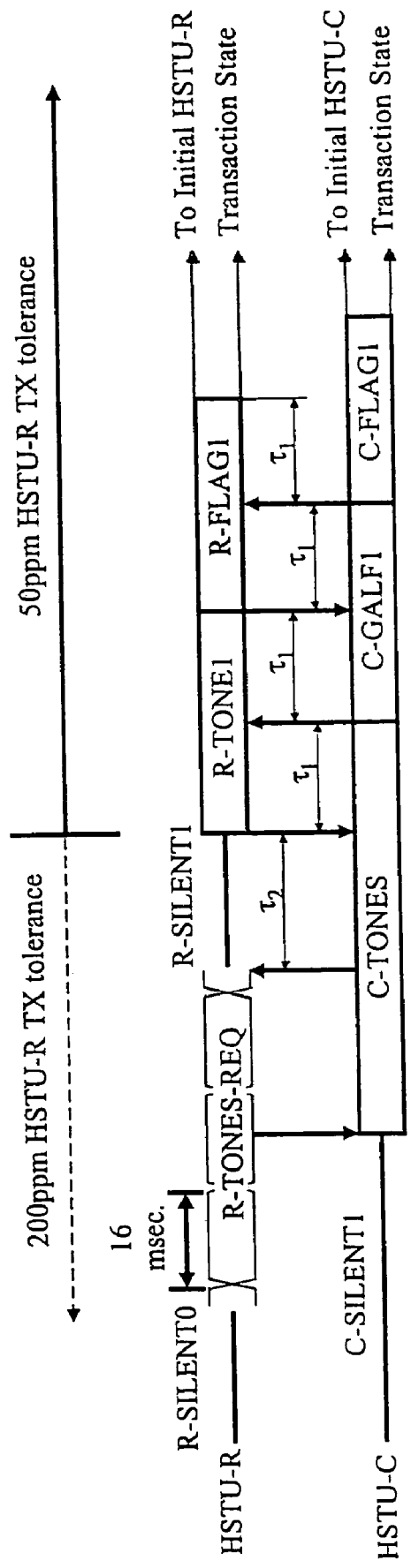
FIG. 3 illustrates a startup initiated by the xTU-R, with both the xTU-R and the xTU-C supporting the full duplex mode.

In the prior art, both the central office and the remote system communicate with each other in a full duplex mode. FIG. 3 illustrates a timing sequence for an example in which the xTU-R initiates a startup procedure, in which both devices operating in a full duplex mode. As shown in FIG. 3, the xTU-R initiates the startup procedure by transmitting signals from one (or both) of its signal families (R-TONES-REQ), with a phase reversal occurring approximately every 16 ms. When the R-TONES-REQ signal is detected by the xTU-C, the xTU-C responds by transmitting signals from one (or both) of its signal families (C-TONES). When the C-TONES signal is detected by the xTU-R, the xTU-R stops transmitting (e.g., transmits silence) for a predetermined time period $\tau_2$, such as, for example, between approximately 50 ms to approximately 500 ms, and then transmits signals from only one signal family (R-TONE1). When the xTU-C detects the R-TONE1 signal, it responds by transmitting C-GALF1 (hex character "81") on the modulated carriers. The xTU-R receives the C-GALF1 characters, and responds by transmitting R-FLAG1 flags (hex character "7E") on modulated carriers. After R-FLAG1 flags are received by the xTU-C, the xTU-C responds by transmitting C-FLAG1 Flags. When the xTU-R has received the C-FLAG1 Flags transmitted from the xTU-C, the xTU-R can begin a first transaction.

xTU-C Initiates Startup—xTU-R And xTU-C Both Support Full Duplex Mode

Figure 4:
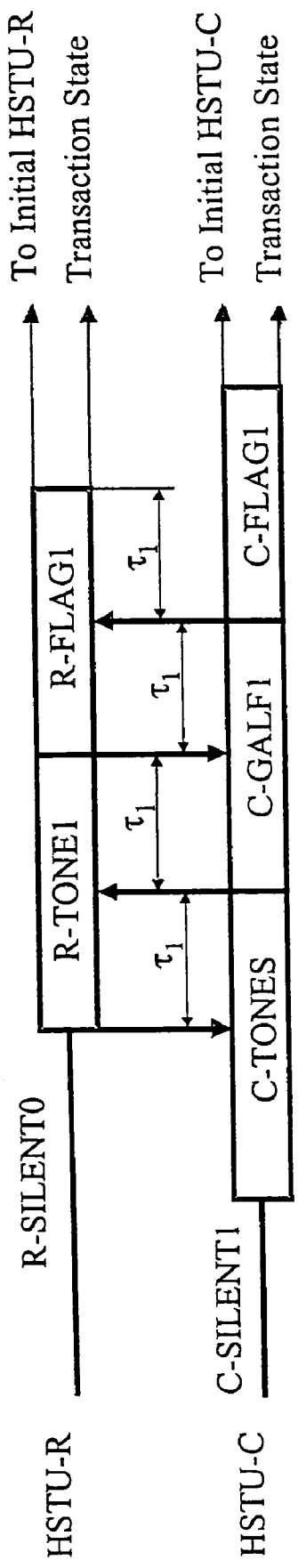
FIG. 4 illustrates a startup initiated by the xTU-C, with both the xTU-R and the xTU-C supporting the full duplex mode.

FIG. 4 illustrates a timing sequence for a prior art example in which the xTU-C and the xTU-R communicate with each other in the full duplex mode, and the xTU-C initiates the startup procedure. In this example, the xTU-C starts by transmitting signals from one (or both) of its signal families (C-TONES). When the C-TONES signal is detected by the xTU-R, the xTU-R responds by transmitting signals from only one signal family (R-TONE1). When the xTU-C detects the R-TONE1 signal, the xTU-C responds by transmitting C-GALF1 GALFs (hex character 81) on the modulated carriers. When the C-GALF1 GALFs characters are received by the xTU-R, the xTU-R responds by transmitting R-FLAG1 Flags (hex character 7E) on the modulated carriers. Once the R-FLAG1 Flags are received by the xTU-C, the xTU-C responds by transmitting C-FLAG1 Flags. The xTU-R receives the C-FLAG1 Flags, and can begin the first transaction.

Prior art systems have been unable to establish a communication session when the operating mode of the central office system and the remote system differ. The present invention discloses a scheme for addressing this problem. The specific procedure depends on which device (e.g., the xTU-C or the xTU-R) initiates the activation sequence, and the full duplex/half duplex capabilities of each device. The initialization signals and process of the instant invention is fully backward compatible with the existing prior-art equipment, and will be described below. This backward compatibility between the equipment of the present invention and the prior art handshake equipment (that only support the full duplex mode), is an important feature of the instant invention.

Figure 7:
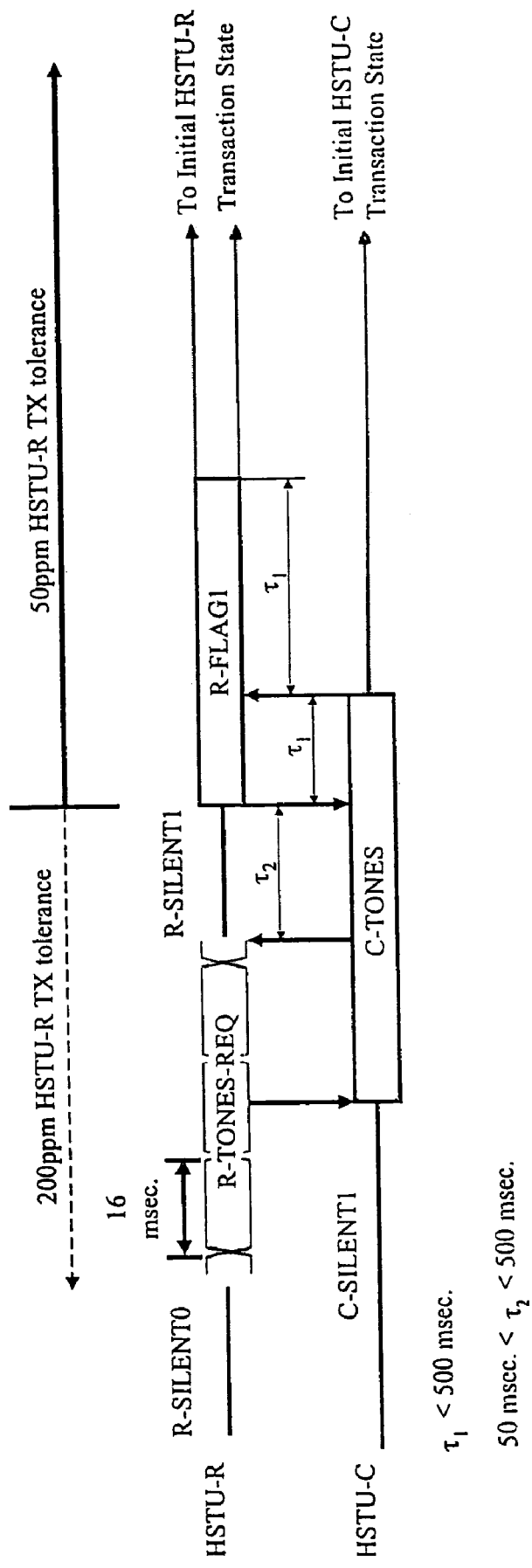
FIG. 7 illustrates a startup initiated by the xTU-R, with both the xTU-R and the xTU-C supporting the half duplex mode.
Figure 8:
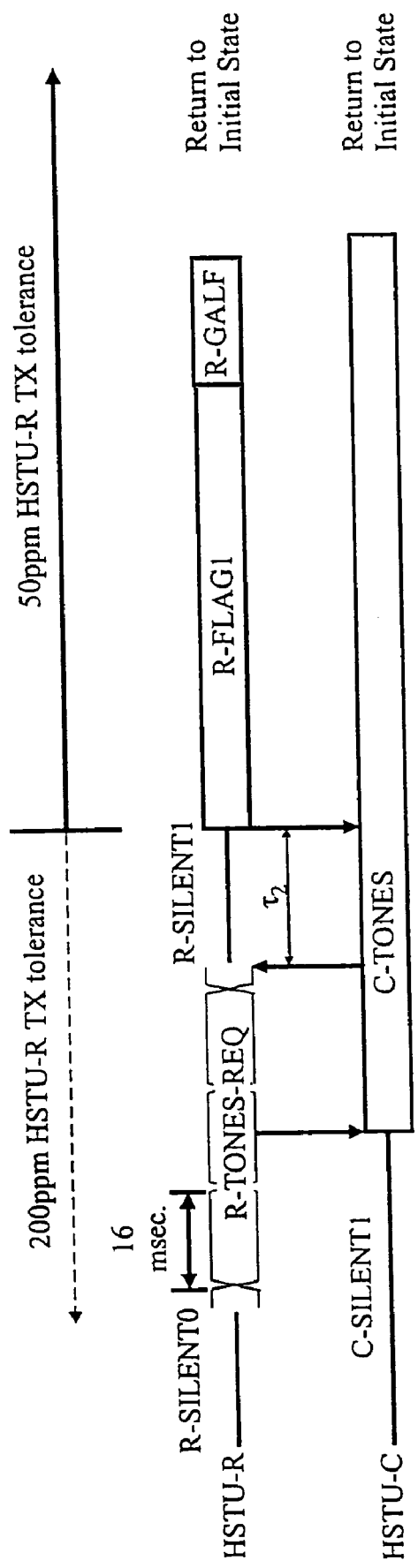
FIG. 8 illustrates a startup initiated by the xTU-R, with the xTU-R supporting the half duplex mode and the xTU-C supporting the full duplex mode.
Figure 9:
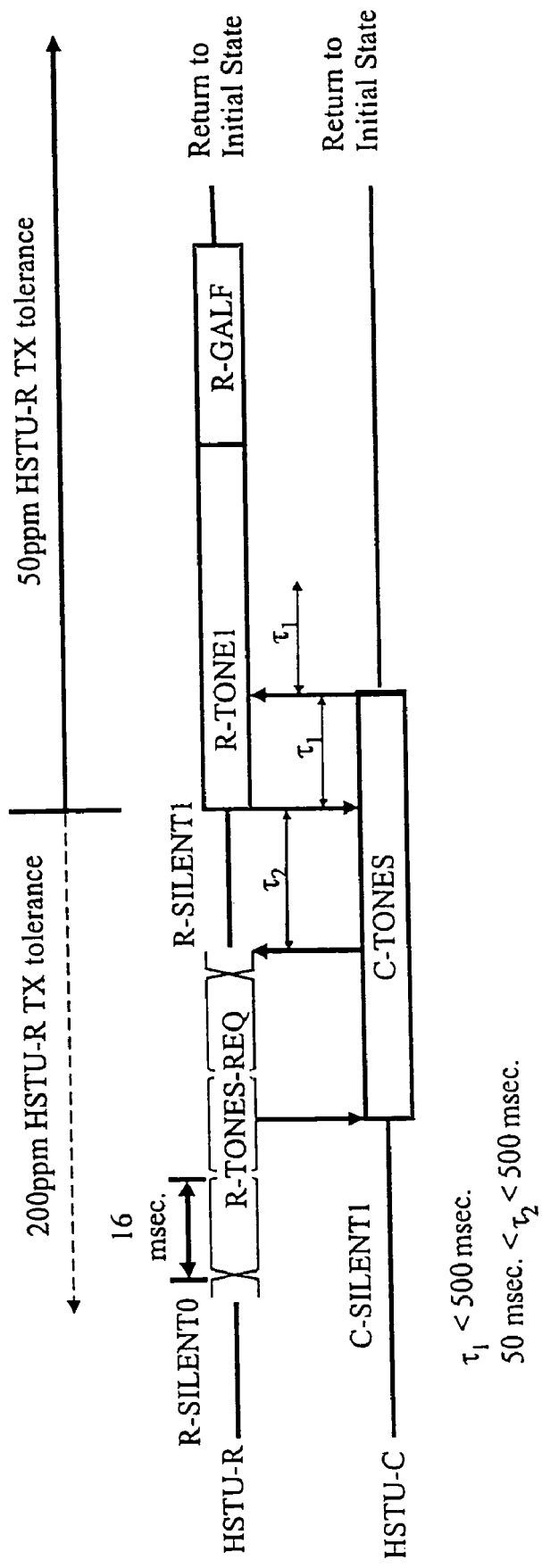
FIG. 9 illustrates a startup initiated by the xTU-R, with the xTU-R supporting the full duplex mode and the xTU-C supporting the half duplex mode.
Figure 10:
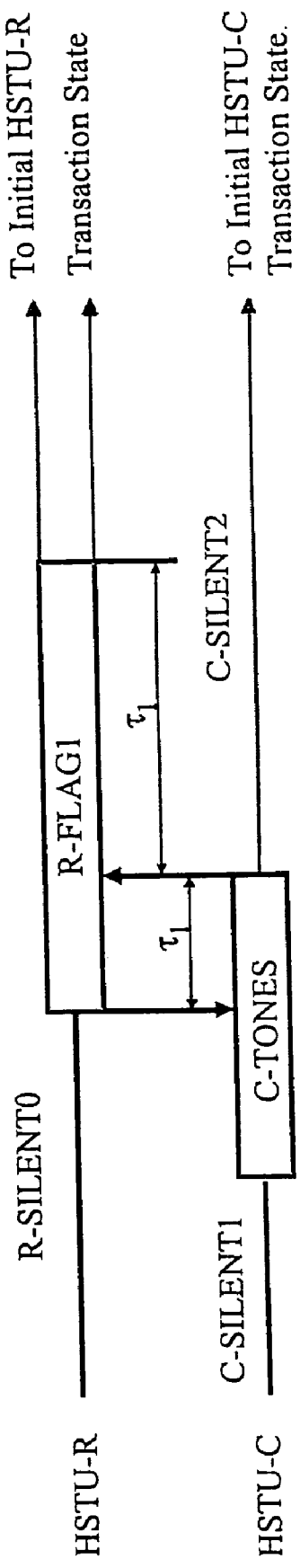
FIG. 10 illustrates a startup initiated by the xTU-C, with both the xTU-R and the xTU-C supporting the half duplex mode.
Figure 11:
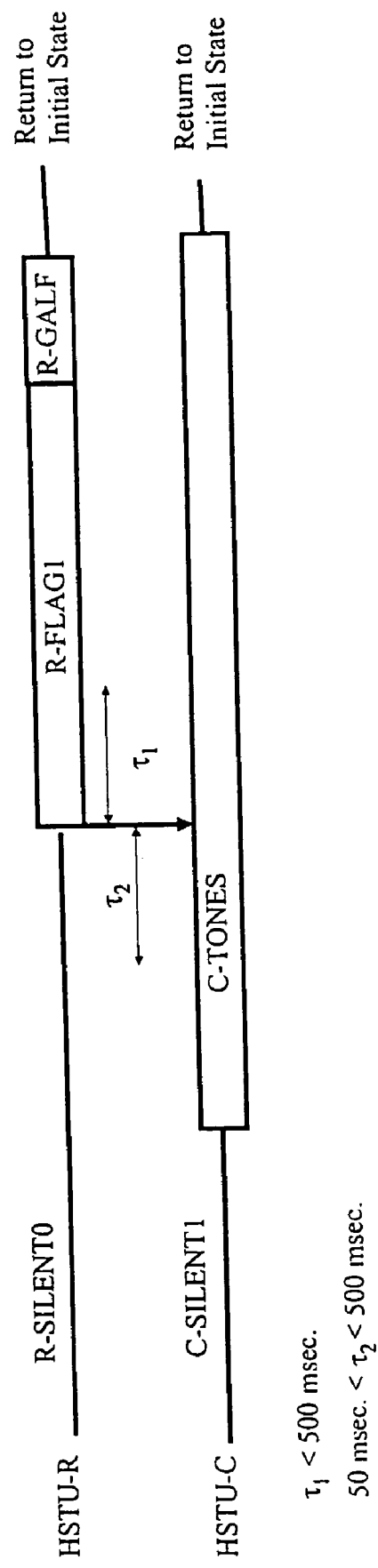
FIG. 11 illustrates a startup initiated by the xTU-C, with the xTU-R supporting the half duplex mode and the xTU-C supporting the full duplex mode.
Figure 12:
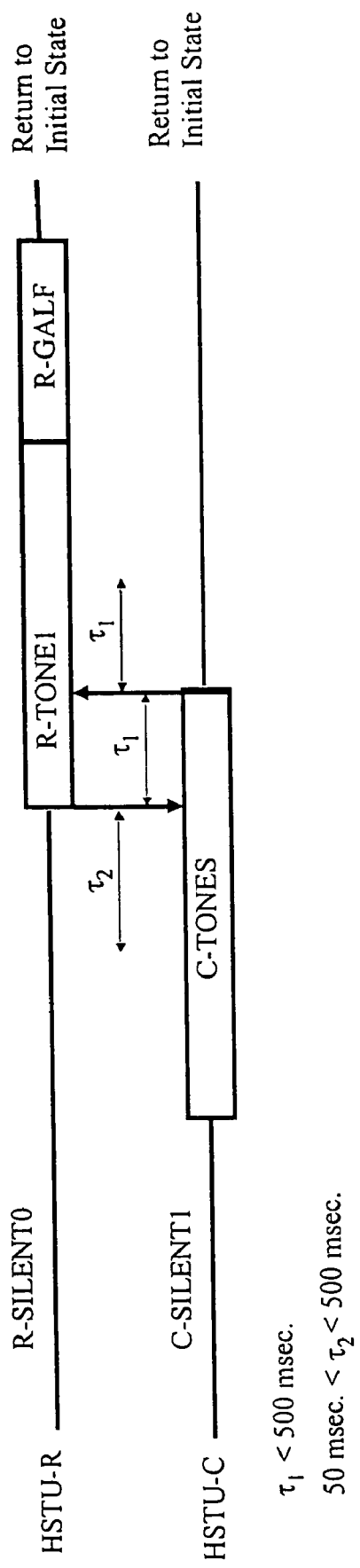
FIG. 12 illustrates a startup initiated by the xTU-C, with the xTU-R supporting the full duplex mode and the xTU-C supporting the half duplex mode.

The various initiation startup sessions addressed by the current invention, to be described below, include:

(a) Startup initiated by xTU-R, where both the xTU-R and the xTU-C support the half duplex mode, as illustrated in FIG. 7;

(b) Startup initiated by xTU-R, where the xTU-R only supports the half duplex mode and the xTU-C supports only the full duplex mode, as illustrated in FIG. 8;

(c) Startup initiated by xTU-R, where the xTU-R only supports the full duplex mode and the xTU-C only supports the half duplex mode, as illustrated in FIG. 9;

(d) Startup initiated by xTU-C, where both the xTU-R and the xTU-C support the half duplex mode, as illustrated in FIG. 10;

(e) Startup initiated by xTU-C, where the xTU-R only supports the half duplex mode and the xTU-C only supports the full duplex mode, as illustrated in FIG. 11; and (f) Startup initiated by xTU-C, where the xTU-R only supports the full duplex mode and the xTU-C only supports the half duplex mode, as illustrated in FIG. 12.

An xTU-R indicates it desires to conduct a transaction in full duplex mode by responding to C-TONES with R-TONE1 instead of R-FLAG1. An xTU-R indicates it desires to conduct a transaction in half duplex mode by responding to C-TONES with R-FLAG1 instead of R-TONE1.

xTU-R Initiates Startup—xTU-R And xTU-C Both Support Half Duplex Mode

FIG. 7 illustrates the situation in which the xTU-R initiates the startup sequence, and both the xTU-R and the xTU-C support the half duplex mode. The xTU-R begins transmitting signals from one (or both) of its signal families (R-TONES-REQ), with phase reversals occurring at predetermined time intervals, such as, for example, approximately every 16 ms. When the R-TONES-REQ signal is detected by the xTU-C, the xTU-C responds by transmitting signals from one (or both) of its signal families (C-TONES). When the C-TONES signal is detected by the xTU-R, the xTU-R stops transmitting (e.g., transmits silence) for a predetermined period of time $\tau_2$, such as, for example, approximately 50 ms to approximately 500 ms. Then, the xTU-R transmits signals from one signal family (R-FLAG1) for a selected period of time $\tau_1$, such as, for example, at least 100 ms, until the xTU-C turns off the C-TONES signal. After the last R-FLAG1 flag is transmitted, the xTU-R continues sending the message, followed by at least two flags (R-FLAG-HD2). When the xTU-C detects R-FLAG-HD2, it responds by transmitting flags (C-FLAG-HD) for a certain time period, such as, for example, approximately 100 ms. After the last flag has been transmitted, the xTU-C continues sending the message, followed by at least two flags (C-FLAG-HD2). If the xTU-C message was an ACK, the xTU-R begins the selected mode initialization sequence. On the other hand, if the ATU-C message was not an ACK, the xTU-R resumes transmitting R-FLAG1 (above), and continues as described above. Likewise, the xTU-C prepares to receive R-FLAG1, and continues as described above.

xTU-R Initiates Startup—xTU-R Only Supports Half Duplex Mode and xTU-C Only Supports Full Duplex Mode FIG. 8 illustrates the situation in which the xTU-R initiates the startup sequence, with the xTU-R supporting only the half duplex mode and the xTU-C supporting only the full duplex mode. The xTU-R begins transmitting signals from one (or both) of its signal families (R-TONES-REQ), with phase reversals occurring every predetermined time interval, such as, for example, approximately every 16 ms. When the R-TONES-REQ signal is detected by the xTU-C, the xTU-C responds by transmitting signals from one (or both) of its signal families (C-TONES). When the C-TONES signal is detected by the xTU-R, the xTU-R stops transmitting (e.g., transmits silence) for a predetermined period of time $\tau_2$, such as, for example, approximately 50 ms to approximately 500 ms. Then, the xTU-R transmits signals from a signal family (R-FLAG1) for a selected period of time $\tau_1$, such as, for example, at least 100 ms.

Since the xTU-C operates only in the full duplex mode, the xTU-C does not transmit a C-GALF signal, nor does it turn off the C-TONES signal it has been transmitting. Instead, the xTU-C continues to transmit the C-TONES signal. Because the xTU-R does not see the end of the C-TONES signal, the xTU-R concludes that the xTU-C cannot support the half duplex mode. Accordingly, the xTU-R transmits at least 2 octets of the R-GALF Galfs signal to terminate the session, and then stops transmitting. Since the xTU-C sees the R-GALF Galfs signal, the xTU-C stops transmitting the C-TONES signal, and the startup session is over.

xTU-R Initiates Startup—xTU-R Only Supports Full Duplex Mode And xTU-C Only Supports Half Duplex Mode FIG. 9 illustrates the situation in which the startup session is initiated by the xTU-R, in which the xTU-R supports only a full duplex mode and the xTU-C supports only a half duplex mode. The xTU-R begins the session by transmitting signals from one (or both) of its signal families (R-TONES-REQ), with phase reversals occurring every predetermined time interval, such as, for example, approximately every 16 ms: When the R-TONES-REQ signal is detected by the xTU-C, the xTU-C responds by transmitting signals from one (or both) of its signal families (C-TONES). When the C-TONES signal is detected by the xTU-R, the xTU-R stops transmitting (e.g., transmits silence) for a predetermined period of time $\tau_2$, such as, for example, approximately 50 ms to approximately 500 ms. After the predetermined period of time elapses, the xTU-R transmits signals from a signal family (R-TONE1) for a selected period of time $\tau_1$, such as, for example, at least 100 ms.

Since the xTU-C operates only in the half duplex mode, the xTU-C turns off the C-TONES signal it has been transmitting. Since the xTU-R does not see a C-GALF signal within a suitable time period, but can detect a transmission energy drop (e.g., that the transmission of data has stopped), the xTU-R concludes that the xTU-C cannot support the full duplex mode. Accordingly, the xTU-R transmits at least 2 octets of the R-GALF signal, and stops transmitting. At this point, the startup session is completed.

xTU-C Initiates Startup—xTU-R And xTU-C Only Support Half Duplex Mode

FIG. 10 illustrates the situation where the startup is initiated by xTU-C, with the xTU-R only supporting the half duplex mode and the xTU-C only supporting the half duplex mode. The xTU-C beings transmitting signals from one (or both) of its signal families (C-TONES). When the C-TONES signal is detected by the xTU-R for a predetermined period of time $\tau_2$, such as, for example, approximately 50 ms to approximately 500 ms, the xTU-R transmits signals from one signal family (R-FLAG1) for a selected period of time $\tau_1$, such as, for example, at least approximately 100 ms, until the xTU-C turns off the C-TONES signal. After the last flag has been transmitted, the xTU-R continues sending the message, followed by at least two flags (R-FLAG-HD2). When the xTU-C detects the R-FLAG-HD2 signal, the xTU-C begins transmitting flags (C-FLAG-HD) for a period of, for example, approximately 100 ms. After the last flag is transmitted, the xTU-C If the xTU-C message was an ACK, the xTU-R begins the selected mode initialization sequence. On the other hand if the xTU-C message was not an ACK, the xTU-R continues to transmit the R-FLAG1 (described above), and continues as described above. In a similar fashion, the xTU-C prepares to receive the R-FLAG1 signal, and continues as above. The xTU-R terminates the session with the ACK signal.

xTU-C Initiates Startup—xTU-R Only Supports Half Duplex Mode and xTU-C Only Supports Full Duplex Mode FIG. 11 illustrates the situation where the startup is initiated by xTU-C, with the xTU-R only supporting the half duplex mode and the xTU-C only supporting the full duplex mode. The xTU-C begins transmitting signals from one (or both) of its signal families (C-Tones). When the C-Tones signal is detected by the xTU-R for a predetermined period of time $\tau_2$, such as, for example, from approximately 50 to approximately 500 ms, the xTU-R transmits flag signals from a signal family (R-FLAG1) for a selected period of time $\tau_1$, such as, for example, at least 100 ms. Since the xTU-C only supports the full duplex mode, the xTU-C does not transmit a C-GALF signal, nor does the xTU-C turn off the C-TONES signal. Instead, the xTU-C continues transmitting the C-TONES signal. As a result, the xTU-R does not detect (see) the end of the C-TONES signal, and concludes that the xTU-C cannot support the half duplex mode. Accordingly, the xTU-R transmits at least 2 octets of R-GALF, and then stops transmitting. The xTU-C detects the R-GALF, stops transmitting the C-TONES signal, and the session is completed.

xTU-C Initiates Startup—xTU-R Only Supports Full Duplex Mode While xTU-C Only Supports Half Duplex Mode FIG. 12 illustrates the situation when the startup sequence is initiated by the xTU-C, with the xTU-R only supporting the full duplex mode and the xTU-C only supporting the half duplex mode. The xTU-C begins transmitting signals from one (or both) of its signal families (C-TONES). When the C-TONES signal is detected by the xTU-R for a predetermined period of time $\tau_2$, such as, for example, approximately 50 ms to approximately 500 ms, the xTU-R responds by transmitting signals from a signal family (R-TONE1) for a selected period of time $\tau_1$, such as, for example, at least approximately 100 ms. Since the xTU-C only supports the half duplex mode, it stops transmitting (turns off) the C-TONES signal. The xTU-R does not detect C-GALF prior to the occurrence of a suitable timeout, but does detect the energy drop (e.g., non-transmission of the C-TONES signal). Accordingly, the xTU-R concludes that the xTU-C cannot support the full duplex mode, and transmits 2 octets of R-GALF, after which the xTU-R ceases its transmission, completing the startup session.

Figure 5:
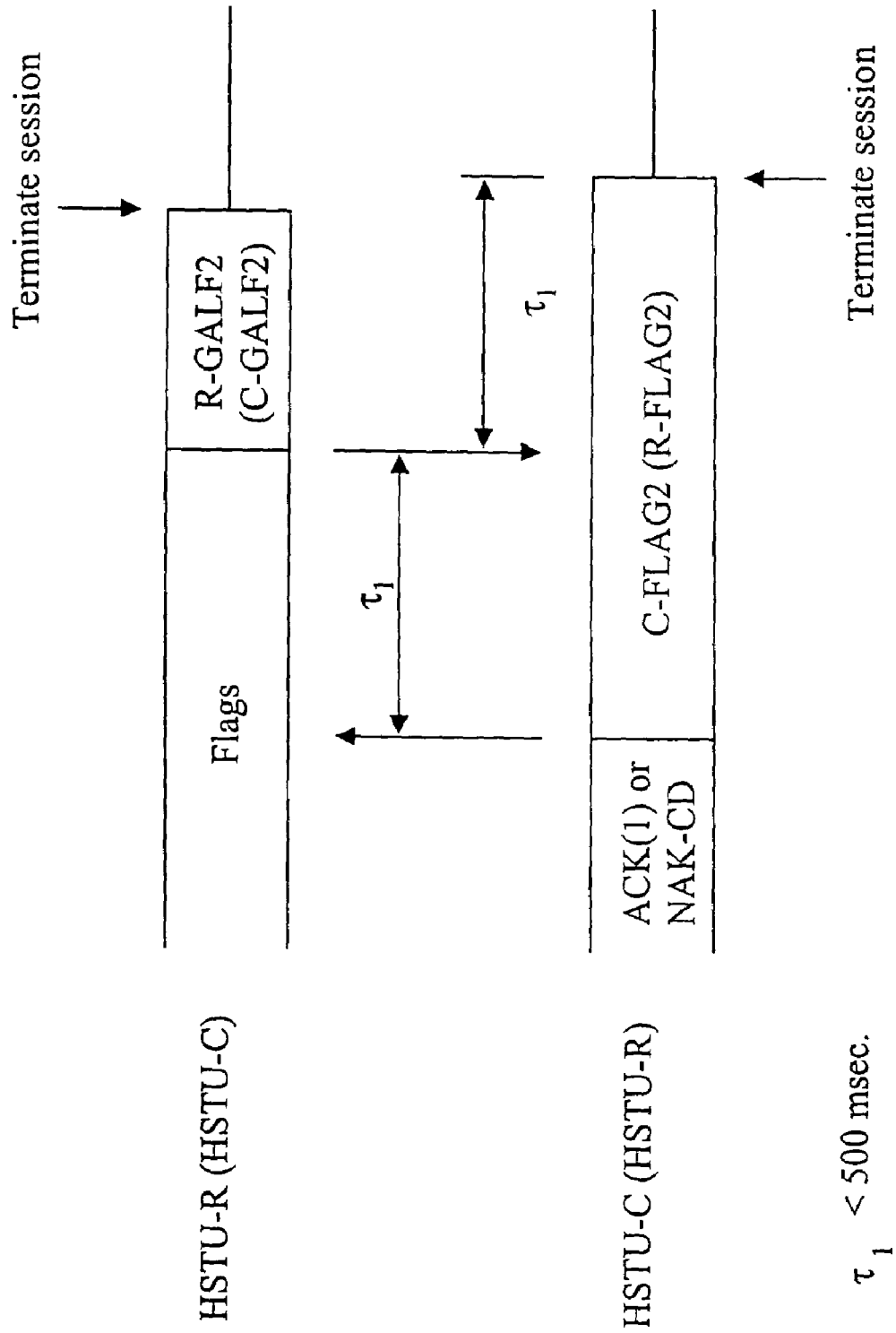
FIG. 5 illustrates a timing sequence for deactivating a session by either the xTU-R or the xTU-C, using full duplex procedures.

In each of the above descriptions, the startup session is eventually terminated. FIG. 5 displays the timing for deactivating a session by either the xTU-R or the xTU-C using full duplex procedures. When the xTU-R (or the xTU-C) has completed sending an MS (mode select) message, it begins to transmit the Flag (hex "7E") characters. When the xTU-C (or the xTU-R) receives the MS message, the xTU-C (or the xTU-R) stops sending the Flag characters and sends an ACK(1) message. When the xTU-R (or the xTU-C) receives the ACK(1) message, the xTU-R (or the xTU-C) sends a single GALF octet (hex "81"), stops transmitting data (e.g., transmits silence) and exits to the selected operating mode. When the xTU-C (or the xTU-R) receives either the GALF character or detects the period of silence, the xTU-C (or the xTU-R) stops transmitting data (e.g., transmits silence) and also exits to the selected operating mode.

Figure 6:
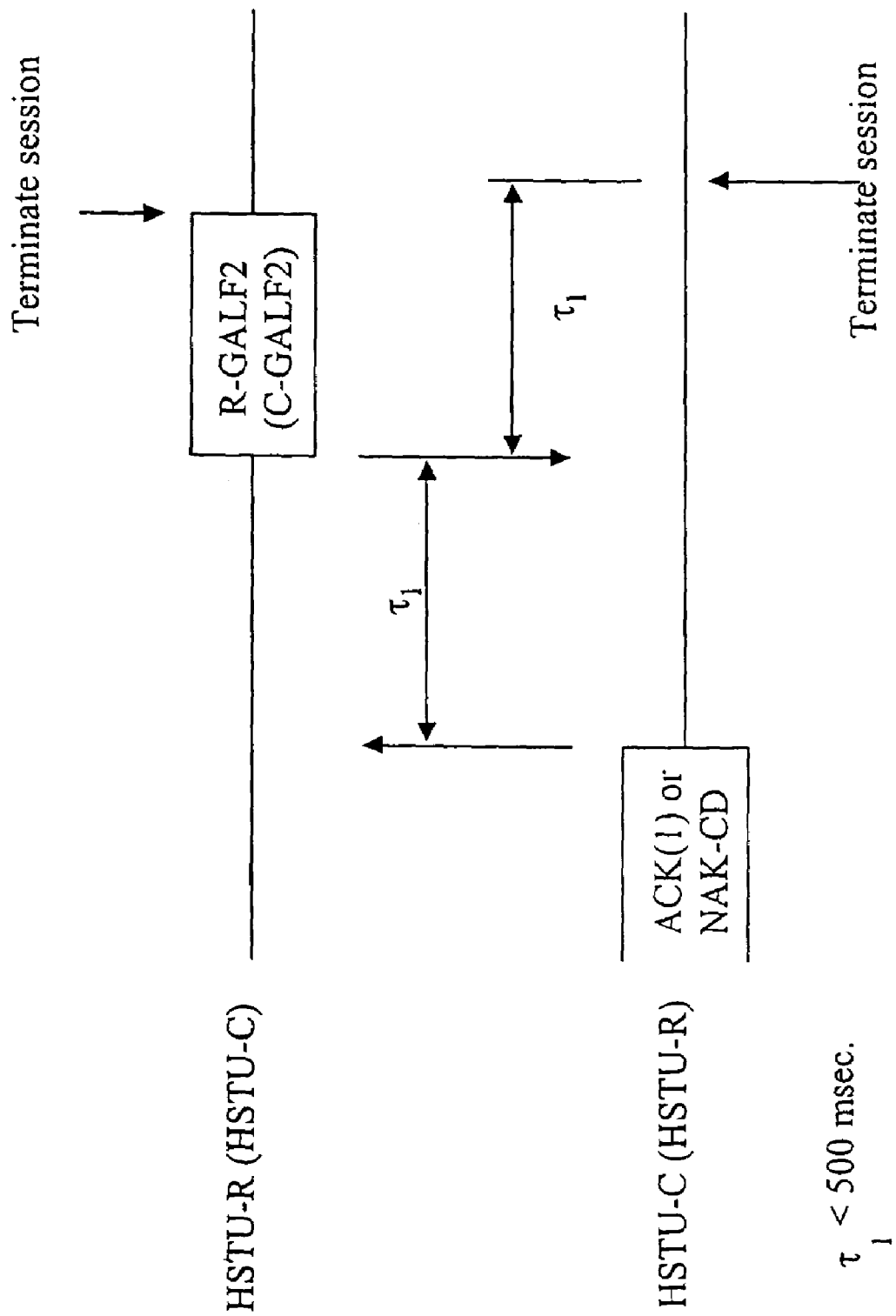
FIG. 6 illustrates the timing sequence for deactivating a session by either the xTU-R or the xTU-C, using half duplex procedures.

FIG. 6 displays the timing for deactivating a session by either the xTU-R or the xTU-C using half duplex procedures. The procedure is similar to that described above for the full duplex procedure. Specifically, the xTU-R (or the xTU-C) sends an ACK(1) message. When the xTU-R (or the xTU-C) receives the ACK(1) message, the xTU-R (or the xTU-C) stops transmitting data (e.g., transmits silence), sends a single GALF octet (hex "81"), and exits to the selected operating mode. When the xTU-C (or the xTU-R) detects the period of silence, the xTU-C (or the xTU-R) stops transmitting data (e.g., transmits silence) and also exits to the selected operating mode.

After the handshake session has been initiated, and before it is terminated, one or more transactions are used to exchange data between the xTU-C and the xTU-R. Each transaction consists of one or more messages which contain data and/or requests, and then concludes with an acknowledgment message (or a negative-acknowledgment message). The data includes, but is not limited to, for example: equipment capabilities, channel capabilities, available modes of operation, user requests, application requests, and service requests. Requests may include, but are not limited to, for example: requested mode of operation, requested data rates, and requested protocol. The unit responding to a message indicates an acceptance (with an acknowledgment message), a rejection (with a negative-acknowledgment message), or a desire to initiate a different type of message with a request message. Depending on the response, a unit may initiate another transaction or terminate the handshake session. An acknowledgment to a mode selection message will cause the handshake session to be terminated, and the communication mode selected in the mode selection message to be initiated, using known techniques.

During the message transmission, several categories of information are transmitted. The categories include, but are not limited to, for example: Identification of Service Parameters and Channel Capabilities; Standard Information of Modulations and Protocols; and Non-standard information, which is proprietary to the implementation or manufacturer. The information is specific to communication methods, as well as generically described information. Analysis of the information by each terminal enables selection of the communication mode and parameters for an optimized communication.

Examples of Identification information include, but are not limited to, for example: message type; vendor identification; amount and type of bandwidth; splitter information; spectrum usable frequencies; and number of data channels.

Examples of Standard Information include, but are not limited to for example: types of xDSL standards supported, regional considerations, and xDSL modulation parameters; error correction protocol information; data compression protocol information; and other protocol information. The methods for generating and analyzing the information content is well known by those skilled in the art, and thus, is not discussed herein.

The information content of the messages must be encoded in a consistent, scalable, and extensible manner so as to promote interoperability among equipment and compatibility with future equipment and services. The prior art (e.g., V.8, V.8bis) provides general examples of means to frame and format handshaking data. Handshaking for xDSL modems also require the transmission of new data types, such as variables and multiple resolution parameters. Examples of encoding mechanism are given below. Specific names and encodings of parameters are dependent on the particular high speed communication system being used.

Table 1 illustrates how to encode a small integer variable:

TABLE 1

| Number of segments octet | | | | | | | | |
|---|---|---|---|---|---|---|---|---|
| Segments NPar(3)s | 8 | 7 | 6 | 5 | 4 | 3 | 2 | 1 |
| Unspecified by terminal | x | x | 0 | 0 | 0 | 0 | 0 | 0 |
| # segments (bits 6–1) | x | x | x | x | x | x | x | x |
| Reserved for allocation by the ITU-T | x | x | 1 | 1 | 1 | 1 | 1 | 1 |

Table 2 illustrates how to encode a range larger than the number of bits:

TABLE 2

| Duration octet | | | | | | | | |
|---|---|---|---|---|---|---|---|---|
| Data rate NPar(3)s | 8 | 7 | 6 | 5 | 4 | 3 | 2 | 1 |
| Duration (bits 6–1 × 5 ms) | x | x | x | x | x | x | x | x |
| Reserved | x | x | 1 | 1 | 1 | 1 | 1 | 1 |

Table 3 illustrates how to encode a parameter with multi-resolutions. Bit 6 is used to indicate the multiplying factor for bits 1 through 5. Additionally, a special code is used to indicate a data rate that is not a multiple of 32 nor 64 kbit/sec:

TABLE 3

| Training parameters - Octet 2 - NPar(3) coding | | | | | | | | |
|---|---|---|---|---|---|---|---|---|
| Data rate NPar(3)s | 8 | 7 | 6 | 5 | 4 | 3 | 2 | 1 |
| Unspecified by terminal | x | x | 0 | 0 | 0 | 0 | 0 | 0 |
| Data rate (bits 5–1 × 32 kbit/s) | x | x | 0 | x | x | x | x | x |
| Data rate (bits 5–1 × 64 kbit/s + 1024 kbit/s) | x | x | 1 | x | x | x | x | x |
| Data rate 1544 kbit/s | x | x | 1 | 1 | 1 | 1 | 1 | 0 |
| Reserved | x | x | 1 | 1 | 1 | 1 | 1 | 1 |

As discussed above, the handshaking procedures must be capable of supporting a wide range of equipment types, including equipment designed and deployed before the present invention, such as, but not limited to, for example, equipment based on ANSI T1.413 or ITU-T V.34. In addition to interoperating with full duplex and half duplex equipment, the instant invention also implements procedures to recognize and function with "legacy" equipment. Legacy equipment can be implicitedly activated by manipulating, for example, a specific escape sequence. With implicit activation, a device supporting the invention will monitor for legacy activation signals, and will transmit legacy activation signals if there are no responses to the handshaking activation signals. In addition to legacy xDSL equipment, a terminal may communicate with voiceband equipment by supporting voiceband standards, indicating the availability thorough the information fields, and then escaping to voiceband standard activation signaling methods.

It is noted that the foregoing examples have been provided for the purpose of explanation, and are in no way to be construed as limiting the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for performing a startup session of a high speed communication session initiated by a remote communication system to determine whether a central communication system supports only one of a full-duplex operating mode and a half duplex operating mode, comprising:
    having the remote communication system transmit an R-FLAG signal to a central communication system, the remote communication system supporting a half duplex operating mode;
    having the remote communication system detect whether a period of silence exists within a predetermined period of time after beginning to transmit the R-FLAG signal;
    having the remote communication system continue to transmit the R-FLAG signal for a certain time period when the period of silence is detected to exist, so that a high speed half-duplex mode communication session is established.

2. The method of claim 1, wherein the remote communication system and the central communication system each support a high speed xDSL communication session.

3. The method of claim 1, wherein having the remote communication system transmit the first predetermined signal comprises transmitting the first predetermined signal from at least one signal family.

* * * * *